United States Patent
Hwangbo

[19]

[11] Patent Number: 5,941,958
[45] Date of Patent: Aug. 24, 1999

[54] DUPLICATED DATA COMMUNICATIONS NETWORK ADAPTOR INCLUDING A PAIR OF CONTROL BOARDS AND INTERFACE BOARDS

[75] Inventor: Jong-Tae Hwangbo, Incheon, Rep. of Korea

[73] Assignee: Daewood Telecom Ltd., Incheon, Rep. of Korea

[21] Appl. No.: 08/879,050

[22] Filed: Jun. 19, 1997

[30] Foreign Application Priority Data

Jun. 20, 1996 [KR] Rep. of Korea ............... 96-22512

[51] Int. Cl.[6] .................................................. G06F 13/00
[52] U.S. Cl. ............................................. 709/250; 714/13
[58] Field of Search .................. 395/182.03, 182.07, 395/182.08, 182.09, 182.11, 200.8

[56] References Cited

U.S. PATENT DOCUMENTS

| | | | |
|---|---|---|---|
| 3,648,252 | 3/1972 | Thron et al. | 340/172.5 |
| 3,810,105 | 5/1974 | England | 340/172.5 |
| 4,351,023 | 9/1982 | Richer | 364/187 |
| 4,958,270 | 9/1990 | McLaughlin et al. | 364/187 |
| 4,959,768 | 9/1990 | Gerhart | 364/187 |
| 5,088,021 | 2/1992 | McLaughlin et al. | 364/187 |
| 5,136,498 | 8/1992 | McLaughlin et al. | 364/184 |
| 5,193,175 | 3/1993 | Cutts, Jr. et al. | 395/575 |
| 5,202,822 | 4/1993 | McLaughlin et al. | 364/187 |
| 5,255,388 | 10/1993 | McLaughlin et al. | 395/600 |
| 5,276,823 | 1/1994 | Cutts, Jr. et al. | 395/575 |
| 5,568,471 | 10/1996 | Hershey et al. | 370/17 |
| 5,638,507 | 6/1997 | Akai et al. | 395/182.11 |
| 5,764,895 | 6/1998 | Chung | 395/700.08 |
| 5,777,874 | 7/1998 | Flood et al. | 364/187 |
| 5,784,551 | 7/1998 | De Leva et al. | 395/182.11 |
| 5,784,573 | 6/1998 | Szczepanek et al. | 395/200.8 |
| 5,796,944 | 8/1998 | Hill et al. | 395/200.8 |

OTHER PUBLICATIONS

IBM Corp., Fault Tolerant Host Channel Adapter, IBM Technical Disclosure Bulletin, vol. 34, No. 7B, pp. 164–166, Dec. 1991.

*Primary Examiner*—Lance Leonard Barry, Esq.
*Attorney, Agent, or Firm*—Pennie & Edmonds LLP

[57] ABSTRACT

An apparatus for interfacing a data processing system with n×N number of data communications network(s) includes N number of interface units, a pair of control units, and linking units, both n and N being positive integer, respectively. The interface units coordinate a data exchange between the data communications network(s) and the control unit in response to control signals, wherein each interface unit includes n communications ports. Each in the pair of control units generates the control signals and coordinates a data exchange between the data processing system and the interfacing units, wherein each control unit is identical to each other, operates alternately in active/stand-by mode and shares data by using a path therebetween. The linking unit is for use in exchanging data between the data processing system and the control units, between the control units and the interfacing units, and between the interfacing units and the data communications network(s).

11 Claims, 4 Drawing Sheets

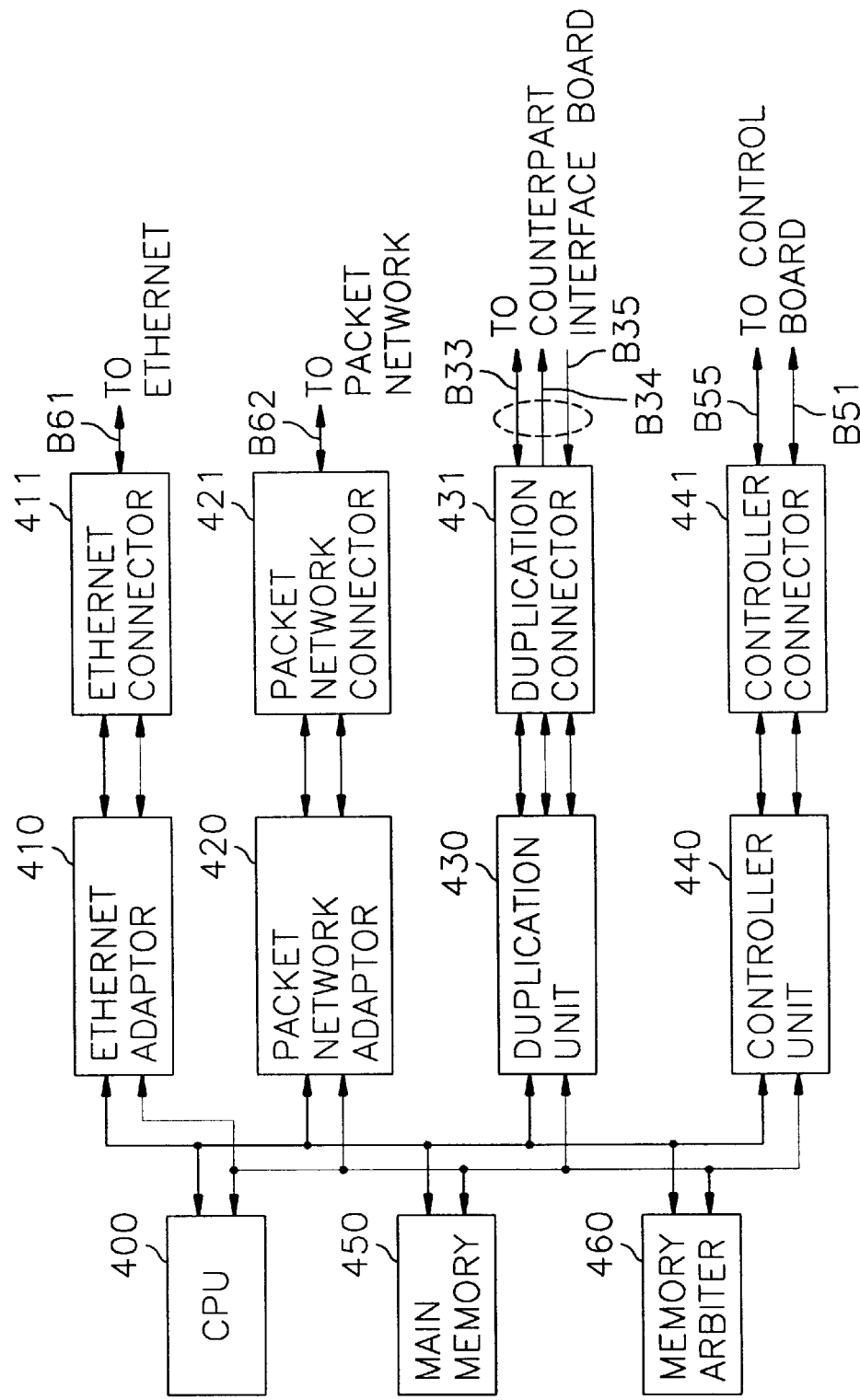

DUPLICATED DATA COMMUNICATIONS NETWORK ADAPTOR INCLUDING A PAIR OF CONTROL BOARDS AND INTERFACE BOARDS

FIELD OF THE INVENTION

The present invention relates to a network adaptor for use in interfacing a data processing system with a plurality of data communications networks; and, more particularly, to a network adaptor wherein the interface board and control board thereof are duplicated.

DESCRIPTION OF THE PRIOR ART

A data communication network may interconnect a plurality of dispersed data processing systems for data exchange among themselves, wherein the data processing system is an electronic apparatus that can store, rearrange and retrieve data, and also can control and communicate with another apparatus; and the data communication network comprises a set of connecting media, e.g., copper or fiber optic lines and communication protocols for use in distributing and exchanging data between the data processing systems. For example, a centralized tariff management system employed in a PSTN(public switched telecommunication network) typically comprises a host data processing system and a plurality of dispersed peripheral data processing systems as a terminal equipment; and a data communications network(s) connecting these data processing systems as a linking equipment.

The so-called Ethernet, a well-known LAN(Local Area Network) protocol, or a packet communications network covered by the ITU-T Rec. X.25 (hereinafter referred to as "X.25 packet network") is frequently adopted as the linking equipment for the exchange of data between the host data processing system and each of the peripheral data processing systems.

A properly designed network adaptor is required for the interfacing between the data processing system and the data communications network(s). As shown in FIG. 1, a network adaptor 110 linking the data processing system 100 with data networks 120 helps for the data processing system to exchange data, via the networks, with remote data processing systems connected to the other side of the data networks 120. The data networks 120 may include an X.25 packet network 121 and an Ethernet 122.

FIG. 2 is a schematic diagram of a conventional network adaptor 110. Communications between the data processing system 100 and a control unit 210, and among an interface unit 220, the Ethernet 122 and the packet network 121 are performed in a serial pattern by using the well-known RS232C or RS422 protocol. In contrast, communications between the control unit 210 and the interface unit 220 are performed in a parallel pattern by using the well-known VME bus. Therefore, the control unit 210 and the interfacing unit 220 convert serial data into parallel data, and vice versa. The control board 210 generates various control signals to control the interface unit 220. The interface unit 220 performs basic protocol functions of the Ethernet 122 and the X.25 packet network 121. The interface unit 220 has two communications ports for the Ethernet 122 and the packet network 121, respectively, for exchanging data with these networks.

In the conventional network adaptor, however, once an interface is established, it is rather difficult to enlarge the interface capacity. If the data processing system 100 requires more communications ports in addition to the two established communications ports, the data processing system 100 itself must be capable of performing multiple serial communications, requiring a modification of the data processing system 100. Besides, if any part within the conventional network adaptor 110 is out of order, the whole function of the network adaptor 110 could be paralyzed.

SUMMARY OF THE INVENTION

It is, therefore, a primary object of the present invention to provide a network adaptor which is capable of increasing the access capacity to a data communications network(s) and is more reliable.

In accordance with the present invention, there is provided an apparatus for interfacing a data processing system with n×N number of data communications network(s), wherein the data processing system serves to control and communicate with another data processing system, each data communications network is for use in distributing and exchanging data between data processing systems, and n and N are positive integers, respectively, the apparatus comprising: N number of interfacing means for coordinating a data exchange between the data communications network(s) and control means in response to control signals, wherein each interfacing means includes n number of communications ports; a pair of control means for generating the control signals and coordinating a data exchange between the data processing system and the N number of interfacing means, wherein each control means is identical to each other, operates alternately in an active and a standby modes and shares data by using a path therebetween; and linking means for use in exchanging data between the data processing system and the control means, between the controlling means and the interfacing means, and between the interfacing means and the data communications network(s).

BRIEF DESCRIPTION OF THE DRAWINGS

The above and other objects and features of the present invention will become apparent from the following description of preferred embodiments given with reference to the accompanying drawings, in which:

FIG. 4 describes the details of the interface board shown in FIG. 3.

DETAILED DESCRIPTION OF THE PREFERRED EMBODIMENTS

Figure 1:
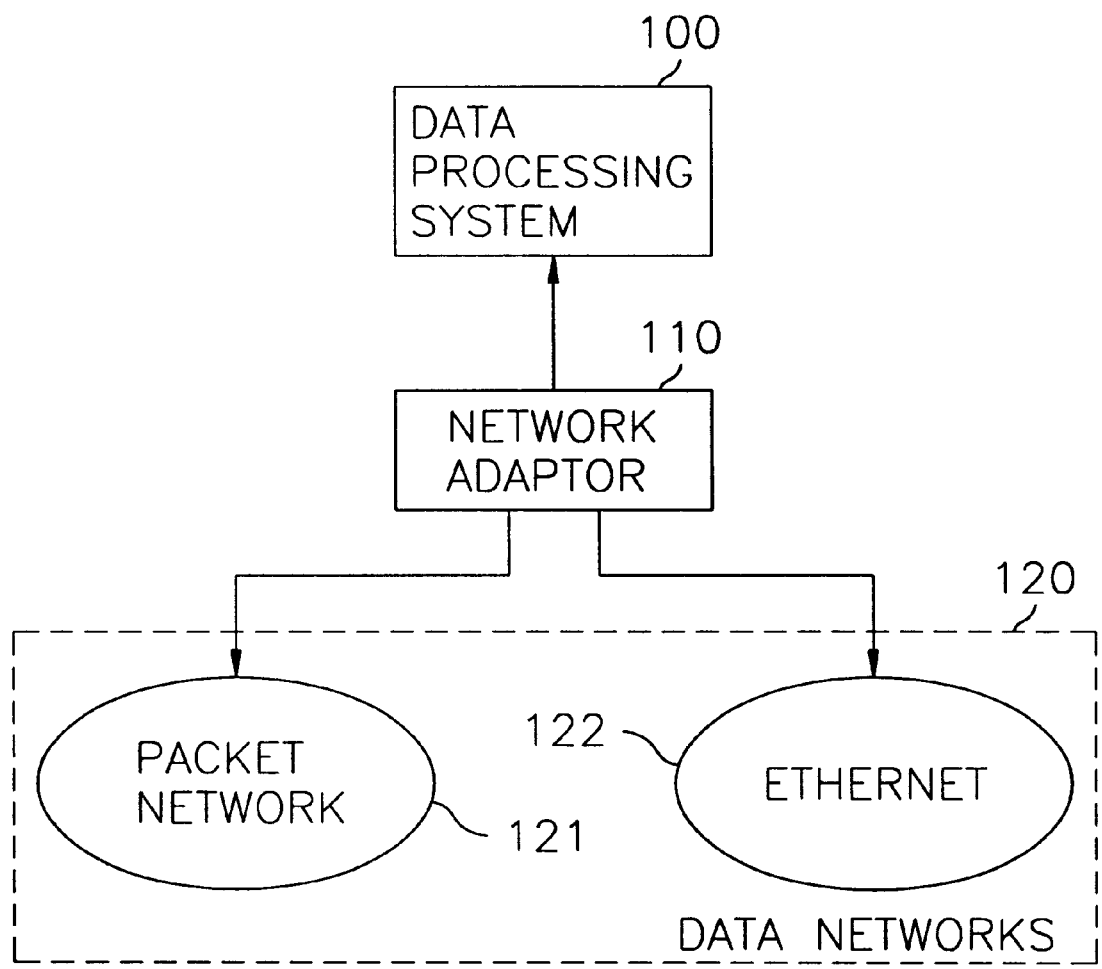
FIG. 1 is a schematic diagram that shows a connection of a data processing system to data networks.
Figure 2:
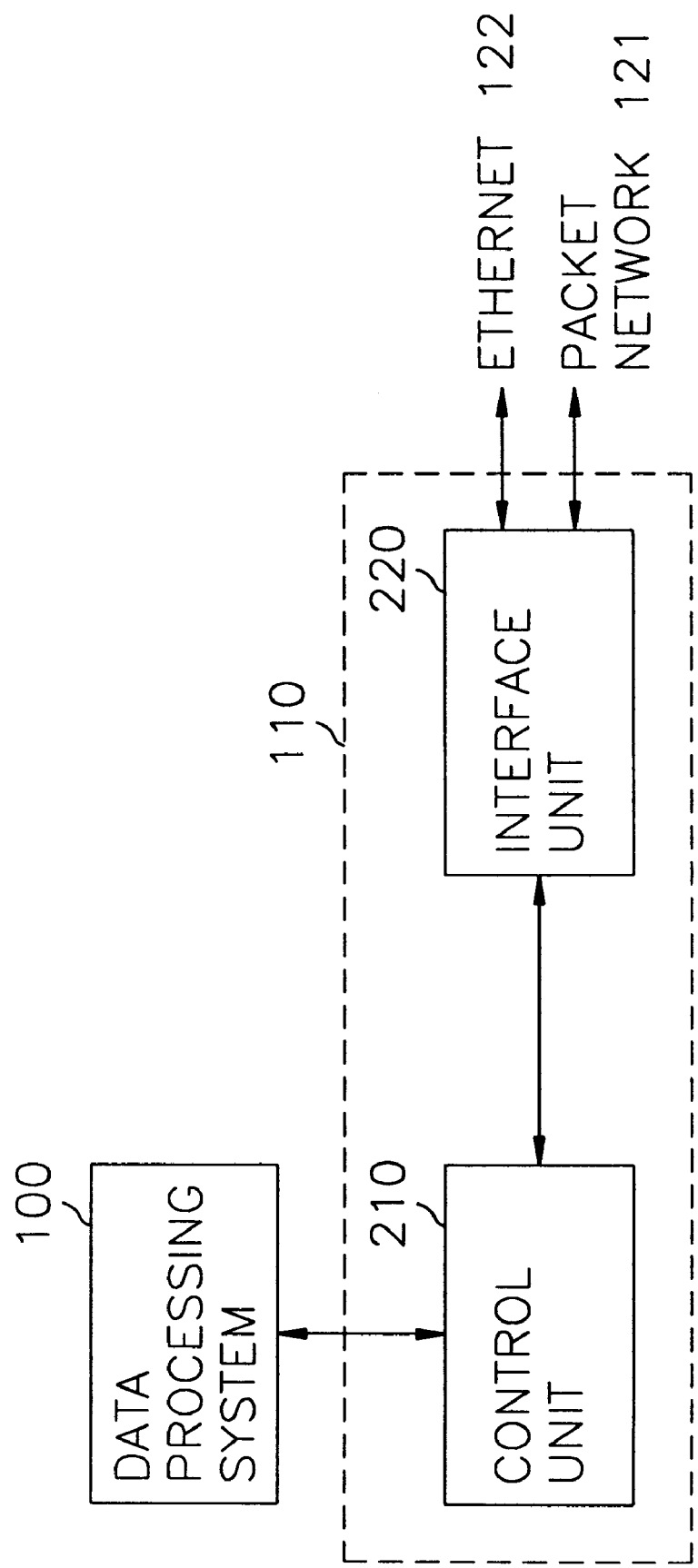
FIG. 2 presents a conventional network adaptor.
Figure 3:
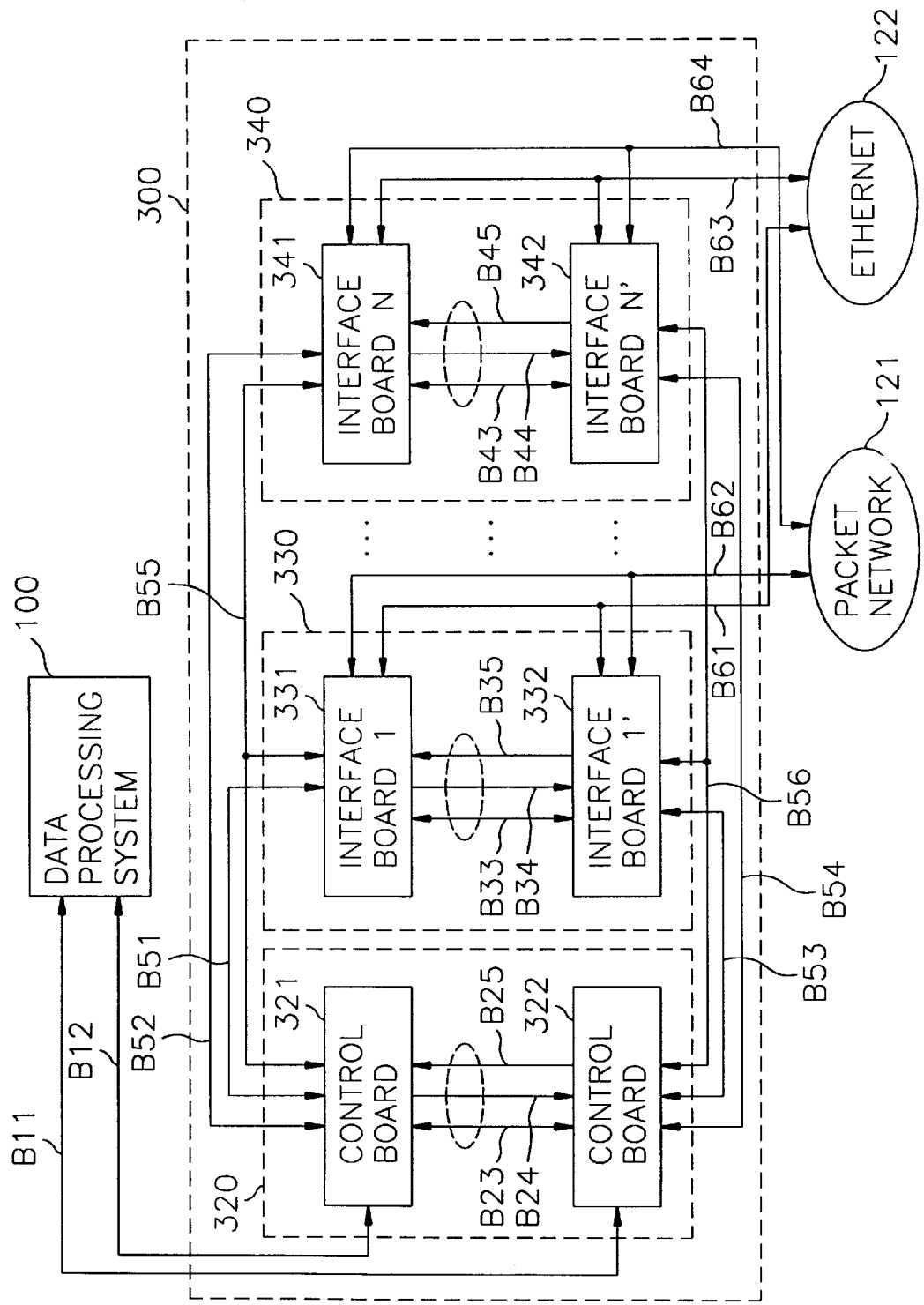
FIG. 3 illustrates a network adaptor in accordance with the present invention.

A network adaptor 300 in accordance with the preferred embodiment of the present invention is shown in FIG. 3, which interfaces a data processing system 100 with a data network(s) 120. Like numerals in FIGS. 1 and 4 refer to like elements. The network adaptor 300 includes a control board pair 320; N number of interface board pairs 330 to 340, wherein N is a positive integer that depends on the fan-out of a control board 321 or 322 in the control board pair 320; and communications buses interconnecting the control boards 321 and 322, 2N interface boards 331, 332 in the interface board pair 330 to 341, 342 in the interface board pair 340, the data processing system 100 and the data networks 120, wherein the data networks 120 include a packet network 121 and an Ethernet 122. For the purpose of illustration, N is chosen to be 2 hereinafter.

The control boards 321 and 322 control the interface units 331, 332, 341, 342 in response to data concerning the status information of the interface boards 331, 341, 332 and 342 received through buses B51 through B54, respectively. The buses B11 and B12 are serial buses, and therefore, the control boards 321 and 322 convert parallel data received from the interface units into serial data to communicate with the data processing system 100. A single control board pair 320 supervises N(N=2) number of the interface board pairs 330 and 340.

The interface boards 331, 341, 332 and 342 exchange data with the data processing system 100 by way of the control boards 321 and 322, communicate with the Ethernet 122 through buses B61 and B63, and communicate with the packet communications network 121 through buses B62 and B64. The interface boards 331, 332, 341 and 342 are identical to each other in terms of structure, function and operation. The interface board 331 and the interface board 332 form an interface board pair 330 operating in active/stand-by mode 330; and the interface board 341 and the interface board 342 also form an interface board pair 340 operating in active/stand-by mode.

Buses B11 and B12 are serial buses for communications between the data processing system 100 and the control boards 321 and 322, embodied by using RS232C and RS422.

Control buses B51 and B52 and data bus B55 connect the control board 321 with the interface boards 331 and 341; and control buses B53 and B54 and data bus B56 connect the control board 322 with the interface boards 332 and 342. Besides, though not shown in the figure, control and data buses, identical to the buses B51, B52 and B55, connect boards: the control board 321 with the interface boards 332 and 342; the control board 322 with the interface boards 331 and 341, too. These buses are all designed as a back-plane bus.

Buses B55 and B56 are used for data transmissions between the control board 321 and the interface boards 331, 341 and between the control board 322 and the interface boards 341, 342, respectively. Buses B23, B33 and B43 serve to share data between two counterpart boards within the respective pairs 320, 330 and 340. Likewise, buses B24, B25, B34, B35, B44 and B45 serve to share status information on each control board and each interface board between two counterpart boards forming the respective pairs. And, buses B61 and B63 are used in exchanging data between the interface boards 331, 332 in the interface board pair 330 and the Ethernet 122, and between the interface boards 341 and 342 in the interface board pair 340 and the Ethernet 122, respectively; and buses B62 and B64 are used in exchanging data between the interface boards 331, 332 in the interface board pair 330 and the packet network 121, and between the interface boards 341 and 342 in the interface board pair 340 and the packet network 121, respectively. The buses B61 and B63 are embodied by using 10Base5, 10Base2 and 10Base-T protocols; the buses B62 and B64 are embodied by using ITU-T Rec. V.35 or V.11 protocols. The preferred embodiment in accordance with the present invention is designed to support all of the above-mentioned protocols 10Base5, 10Base2, 10Base-T, V.35 and V.11 by providing multiple connectors for each protocol inbetween the interface boards 331, 332, 341 and 342 and the packet network 121 and the Ethernet 122. Each of the buses is represented in a single line segment in the figures for the sake of simplicity, but, each of the actual buses is implemented with a bundle of wires.

The network adaptor 300 is designed for a single back-plane board and each of the duplicated pairs 320, 330 and 340 is fabricated as a card, so that the card of each of the pairs 320, 330 and 340 can be inserted into the back-plane board. The communications buses on the back-plane board are implemented on the basis of well-known VME bus.

The description of the operation of the pairs of control boards and the interface boards in active/stand-by mode will now be given hereinafter.

The two control boards 321 and 322 are identical to each other in terms of structure, function and operation but operate alternately in active/stand-by mode. The two control boards 321 and 322 operate in so-called hot stand-by mode; that is, same data is always commonly shared by the two control boards even when only one of the two control boards operates in active mode at a time while the other control board is in stand-by mode. For sharing common data between the dual control boards, use is made of a bus B23 through which one control board in active mode sends data to the other control board in stand-by mode.

In case one of the two control boards, for example, the control board 321, becomes out of order while it is in active mode, the other control board 322 in stand-by mode is designed to automatically enter into active mode and replace the malfunctioning control board 321 without interrupting the operation in progress; the malfunctioning control board 321 automatically turns into stand-by mode and beeps to alert an operator.

Referring to the interface boards 331, 332, 341 and 342, for efficient description, suppose that the control board 321, the interface board 331 and the interface board 341 have been in active mode until the interface board 331 gets out of order. Until the interface board 331 gets out of order, the control board 321 not only sends data to the interface board 331 and the interface board 341 both of which are in active mode, but also sends the data to the interface board 332 and the interface board 342 both of which are in stand-by mode. However, only the interface board 331 and the interface board 341, being in active mode, however, receive the data; the interface board 332 and the interface board 342, being in stand-by mode, do not receive the data. The interface board 332 and the interface board 342 share the data with the interface board 331 and the interface board 341 through the buses B33 and B43, respectively. Upon the interface board 331 getting out of order, the interface board 332 enters into active mode in lieu of the interface board 331. Therefore, the interface board 332 and the interface board 341 are getting into active mode. The control board 321 exchanges data with and controls the interface board 332 and the interface board 341 by using the buses that connect the control board 321 with the interface board 332 and with the interface board 341, respectively.

FIG. 4 illustrates the detailed structure of the interface board 331 shown in FIG. 3 which includes a CPU(Central Processing Unit) 400, an Ethernet adaptor 410, an Ethernet connector 411, a packet network adaptor 420, a packet network connector 421, a duplication unit 430, a controller unit 440, a main memory 450, a memory arbiter 460, a duplication connector 431 and a controller connector 441.

The CPU 400 is connected to the Ethernet adaptor 410, the packet network adaptor 420, the duplication unit 430, the controller unit 440, the main memory 450 and the memory arbiter 460 through both an address-and-data bus which is shown in thick line in FIG. 4 and a control bus which is shown in thin line in FIG. 4; the CPU 400 controls the operation of those parts connected thereto through the control bus.

The Ethernet adaptor 410 have built-in sub-units, which are not explicitly shown in FIG. 4, for performing an Ethernet protocol, for interfacing with the CPU 400, for storing data in an Ethernet RAM, a memory device within the Ethernet adaptor 410, and for controlling the Ethernet RAM. For the network adaptor to send data to the Ethernet 122, the CPU 400 fetches the data to be sent from the main memory 450 and temporarily stores the data in the Ethernet RAM. Subsequently, the CPU 400 instructs the Ethernet adaptor 410 to send data stored in the Ethernet RAM, and in response to the instruction, the Ethernet adaptor 410 sends the data stored in the Ethernet RAM to the Ethernet by way of the Ethernet connector 411. On the other hand, when the network adaptor receives data from the Ethernet, the Ethernet adaptor 410 stores the data received in the Ethernet RAM, and informs the CPU 400 of the reception of the data by sending an interrupt signal. In response to the interrupt signal, the CPU 400 reads the data stored in the Ethernet RAM and stores the data in the main memory 450.

The Ethernet connector 411 is to serve for establishing connection, transferring data and terminating connection. The Ethenet connector 411 also converts serial data coming from the Ethernet into parallel data, and converts parallel data going out to the Ethernet into serial data. The Ethernet connector 411 provides three communications ports, 10Base2, 10Base5 and 10Base-T, each of which is optional to an operator.

The packet network adaptor 420 have built-in sub-units, not explicitly shown in FIG. 4, for implementing an X.25 protocol, for interfacing with the CPU 400, for storing data in a packet RAM, a memory device within the packet network adaptor 420, and for controlling the packet RAM.

For the network adaptor to send data to the packet network 121, the CPU 400 fetches the data to be sent from the main memory 450 and temporarily stores the data in the packet RAM. Subsequently, the CPU 400 instructs the packet network adaptor 420 to send the data stored in the packet RAM and the packet network adaptor 420 sends the data stored in the packet RAM to the packet communications network by way of the packet network connector 421. On the other hand, when the network adaptor 300 receives data from the packet communications network, the packet network adaptor 420 stores the data in the packet RAM, and informs the CPU 400 of the reception of the data by sending an interrupt signal. In response to the interrupt signal, the CPU 400 reads the data stored in the packet RAM and stores the data in the main memory 450.

The packet network connector 421 is to serve for establishing connection, transferring data and terminating connection. The packet network connector 421 also converts serial data coming from the packet network into parallel one, and converts parallel data going out to the packet network into serial one. The packet network connector 421 provides two communications ports, V.35 and V.11, each of which is optional to an operator.

The duplication unit 430 generates a main memory read signal and a main memory write signal, which are used when the CPU 400 reads data from and write data to the main memory 450, respectively. When the CPU 400 writes data to the main memory 450, the duplication unit 430 sends the main memory write signal and the data to the counterpart interface board 332 by way of the duplication connector 431, and vice versa, so that a pair of duplicated interface boards can be updated with identical data.

The duplication connector 431 serves for establishing connection, transferring data and terminating connection.

The controller unit 440, under the control of the CPU 400, stores data delivered thereto via the controller connector 441 from the control board 321, the data being sent originally from the data processing system 100 in the main memory 450; and also, stores data to be sent out to the data processing system 100 in the main memory 450, the data being sent out by way of the controller connector 441. In addition, the controller unit 440 sends out data concerning the status information of the controller unit 440 to the control boards 321 and 322 so that the control boards 321 and 322 can monitor and supervise the interface board 331.

The main memory 450 is for storing data exchanged between the interface board 331 and the data processing system 100.

The controller connector 441 serves for establishing connection, transferring data and terminating connection when data is transferred to and from the control board 321 under the control of the controller unit 440.

The memory arbiter 460 controls buses connected to the CPU 400 so that the CPU 401 can communicate with only one device connected thereto at a time.

From the description above, it is apparent that the network adaptor in accordance with the present invention is more reliable, mainly because the control board pair 320 and the interface board pairs 330 and 340 are duplicated to operate in active/stand-by mode, and each of the duplicated boards is devised to automatically switch over to the other when a trouble occurs in any one of the duplicated boards.

In addition, the network adaptor in accordance with the present invention is more flexible; more interface boards can be added on by simply inserting additional interface boards without having to either replace the whole network adaptor or modify the data processing system 100.

While the present invention has been described with respect to the preferred embodiments, other modifications and variations may be made without departing from the scope and spirit of the present invention as set forth in the following claims.

What is claimed is:

1. An apparatus for interfacing a data processing system with an n×N number of data communications network(s), wherein the data processing system serves to control and communicate with another data processing system, each data communications network is for use in distributing and exchanging data between data processing systems, and n and N are positive integers, respectively, the apparatus comprising:

a pair of control means for generating a plurality of control signals wherein each control means is identical to each other, operates alternately in an active and a stand-by modes and shares data by using a path therebetween;

an N number of interfacing means for coordinating a data exchange between the data communications network(s) and the control means in response to the control signals, wherein each interfacing means includes an n number of communications ports, wherein the pair of control means are further configured to coordinate a data exchange between the data processing system and the N number of interfacing means, and wherein each interfacing means includes:

an adaptor unit for performing data communications protocol functions, storing data to be sent and data received, converting serial data into parallel data, and vice versa, and providing a physical path for exchanging data between the interfacing means and the data communications network(s);

a duplication unit for use in data exchanging between each respective pair of the interfacing means, generating a memory read and a memory write signals so that both interfacing means in the respective pair are updated with same data;

a control unit for use in data exchange between the control means and the data processing system, storing data received from the data processing system, sending out data to the data processing system, and providing status information of the control unit to the control means;

a memory for storing data exchanged between said each interfacing means and the data communications network(s), and between said each interfacing means and the data processing system; and a CPU (central processing unit) for controlling the operation of the adaptor unit duplication unit, control unit and the memory; and linking means for use in exchanging data between the data processing system and the control means, between the controlling means and the interfacing means, and between the interfacing means and the data communications network(s).

2. An apparatus for interfacing a data processing system with n×N number of data communications network(s), wherein the data processing system serves to control and communicate with another data processing system, each data communications network is for use in distributing and exchanging data between data processing systems, and the n and N are positive integers, respectively, which comprises:

control means for generating a plurality of control signals;

an N number of pairs of interfacing means for coordinating a data exchange between the data communications network(s) and the control means in response to the control signals, wherein each interfacing means, being identical to each other, includes an n communications ports, operates alternately in an active and a stand-by modes and shares data by using a path therebetween, wherein the control means is further configured to coordinate a data exchange between the data processing system and the 2N number of interfacing means, and wherein each interfacing means includes:

an adaptor unit for performing data communications protocol functions, storing data to be sent and data received, converting serial data into parallel data, and vice versa, and providing a physical path for exchanging data between the interfacing means and the data communications network(s);

a duplication unit for use in data exchange between the interfacing means in each respective the pair, generating a memory read and a memory write signals so that both interfacing means in the respective pair are updated with same data;

a control unit for use in data exchange between the control means and the data processing system storing data received from the data processing system, sending out data to the data processing system and providing status information of the control unit to the control means;

a memory for storing data exchanged between each interfacing means and the data communications network(s), and between each interfacing means and the data processing system; and a CPU(central processing unit) for controlling the operation of the adaptor unit, duplication unit, control unit and the memory; and linking means for exchanging data between the data processing system and the control means, between the control means and the interfacing means, and between the interfacing means and the data communications network(s).

3. The apparatus of claim 1, wherein the N is a positive even integer, and N number of identical interfacing means form N/2 number of pairs and two interfacing means in each pair operate alternately in an active and a stand-by modes and share data by using a path therebetween.

4. The apparatus recited in any one of claims 1 to 3, wherein the data communications network is an Ethernet.

5. The apparatus recited in any one of claims 1 to 3, wherein the data communications network is an X.25 packet network.

6. The apparatus recited in any one of claims 1 to 3, wherein the data communications network employs both an Ethernet and an X.25 packet network.

7. The apparatus recited in any one of claims 1 to 3, wherein the adaptor unit includes an Ethernet adaptor unit and a packet network adaptor unit, each for performing protocols for the Ethernet and the X.25 packet network.

8. An apparatus for interfacing a data processing system with an n×N number of data communications network(s), where n and N are positive numbers, comprising:

an N number of pairs of interface units configured to coordinate a data exchange between the data communication network(s) and the data processing system, wherein each interface unit operates in one of an active mode and a stand-by mode;

a first control board configured to control the plurality of pairs of interface units in coordinating the data exchange between the data processing system and the data communication network(s); and a backplane board configured to receive the first control board and the plurality of pairs of interface units and configure to allow data exchange therebetween, to establish a communication interface between the data processing system and the data communication network(s), wherein the backplane board is further configured to receive at least one additional pair of interface units and the first control board is further configured to control the at least one additional pair of interface units after the communication interface has been established.

9. The apparatus of claim 8 wherein each interface unit in the plurality of pairs of interface units comprises a duplication unit for use in data exchange between the interface units in each respective pair, generating a memory read and a memory write signals so that both interface units in the pair are updated with same data.

10. The apparatus of claim 8 further comprising a second control board configured to control the interface units in coordinating the data exchange between the data processing system and the data communication network(s), wherein each control board operates in one of an active mode and a stand-by mode.

11. The apparatus of claim 9 wherein the data communication network employs both an Ethernet and an X.25 packet network.

* * * * *